US 9,338,432 B1

(12) United States Patent
Roy

(10) Patent No.: US 9,338,432 B1
(45) Date of Patent: May 10, 2016

(54) MOBILE DEVICE WITH 3-DIMENSIONAL USER INTERFACE

(75) Inventor: Lionel Roy, Cupertino, CA (US)

(73) Assignee: INTUIT INC., Mountain View, CA (US)

( * ) Notice: Subject to any disclaimer, the term of this patent is extended or adjusted under 35 U.S.C. 154(b) by 785 days.

(21) Appl. No.: 13/240,175

(22) Filed: Sep. 22, 2011

(51) Int. Cl.
*H04N 13/02* (2006.01)
*H04N 13/04* (2006.01)
*H04N 13/00* (2006.01)

(52) U.S. Cl.
CPC .......... *H04N 13/0051* (2013.01); *H04N 13/02* (2013.01); *H04N 13/0203* (2013.01); *H04N 13/0207* (2013.01); *H04N 13/0275* (2013.01); *H04N 13/0402* (2013.01); *H04N 13/0459* (2013.01)

(58) Field of Classification Search
CPC .............. H04N 13/0051; H04N 13/02; H04N 13/0203; H04N 13/0207; H04N 13/0275; H04N 13/0402; H04N 13/0459
USPC ..................................................... 348/46, 51
See application file for complete search history.

(56) References Cited

U.S. PATENT DOCUMENTS

| 8,334,841 | B2 * | 12/2012 | Boillot et al. | 345/158 |
| 8,692,853 | B2 * | 4/2014 | Kim et al. | 345/679 |
| 2011/0320969 | A1 * | 12/2011 | Hwang et al. | 715/765 |

* cited by examiner

*Primary Examiner* — Geepy Pe
(74) *Attorney, Agent, or Firm* — Patterson + Sheridan, LLP

(57) ABSTRACT

A portable electronic device provides signals corresponding to information to a display that allows a viewer to perceive 3-dimensional (3-D) depth, where the information includes multiple icons in a user interface that are arranged in 2-dimensional (2-D) fields that are spatially offset along a direction orthogonal to the 2-D fields. Then, the portable electronic device captures spatial-position information (such as a distance with respect to a surface of the display) associated with at least a digit of the viewer. The portable electronic device analyzes the spatial-position information to determine a change in a 3-D spatial position of at least the digit, and associates the change in the 3-D spatial position with at least one of the icons. Next, the portable electronic device performs the operation based on the change in the 3-D spatial position and at least the one of the icons.

16 Claims, 3 Drawing Sheets

⸺ 300

PROVIDE SIGNALS CORRESPONDING TO INFORMATION TO A DISPLAY THAT ALLOWS A VIEWER TO PERCEIVE 3-DIMENSIONAL (3-*D*) DEPTH, WHERE THE INFORMATION INCLUDES MULTIPLE ICONS IN A USER INTERFACE THAT ARE ARRANGED IN 2-DIMENSIONAL (2-*D*) FIELDS THAT ARE SPATIALLY OFFSET ALONG A DIRECTION ORTHOGONAL TO THE 2-*D* FIELDS
310

↓

CAPTURE SPATIAL-POSITION INFORMATION ASSOCIATED WITH A DIGIT OF THE VIEWER
312

↓

ANALYZE THE SPATIAL-POSITION INFORMATION TO DETERMINE A CHANGE IN A 3-*D* POSITION OF AT LEAST THE DIGIT
314

↓

ASSOCIATE THE CHANGE IN THE 3-*D* POSTION WITH AT LEAST ONE OF THE ICONS
316

↓

PERFORM AN OPERATION BASED ON THE CHANGE IN THE 3-*D* POSITION OF AT LEAST ONE OF THE ICONS
318

FIG. 3

MOBILE DEVICE WITH 3-DIMENSIONAL USER INTERFACE

BACKGROUND

The present disclosure relates to a portable electronic device with a display that provides a 3-dimensional (3-D) user interface.

The proliferation of portable computing devices, such as smartphones, has resulted in a dramatic increase in the number of software applications for these platforms, as well as in the associated functionality. Moreover, the amount of information associated with the software applications that needs to be conveyed to users continues to increase.

However, the portability of these computing devices places a constraint on the display size. This makes it difficult to present increasing amounts of information to the users, which can make it difficult for the users to use the software applications and view information on portable computing devices.

SUMMARY

The disclosed embodiments relate to a portable electronic device. This portable electronic device includes a display that conveys stereoscopic information which allows a viewer to perceive 3-dimensional (3-D) depth, and a display driver that provides signals corresponding to information to the display. This information may include multiple icons in a user interface that are arranged in 2-dimensional (2-D) fields that are spatially offset along a direction orthogonal to the 2-D fields. Moreover, the portable electronic device includes a displacement sensor that captures spatial-position information associated with at least a digit of the viewer, where the spatial-position information includes a distance with respect to a surface of the display. Furthermore, control logic in the portable electronic device: analyzes the spatial-position information to determine a change in a 3-D spatial position of at least the digit; associates the change in the 3-D spatial position with at least one of the icons; and performs an operation based on the change in the 3-D spatial position.

For example, the operation may include modifying the information corresponding to at least the one of the icons based on the change in the 3-D spatial position. Note that modifying the information may include: a visual indication that an application associated with at least the one of the icons is executing; changing a location of at least the one of the icons in the 2-D fields; and/or changing a size of at least the one of the icons. Moreover, the operation may include executing an application associated with at least the one of the icons.

Furthermore, the spatial-position information may include an orientation of at least the digit with respect to a surface of the display.

Additionally, the displacement sensor may include an image sensor or at least two image sensors. In some embodiments, the displacement sensor determines the distance based on time of flight.

Note that functions of the portable electronic device may be implemented in hardware. Alternatively or additionally, functions of the portable electronic device may be implemented in software. For example, functions of the display driver, the displacement sensor and/or the control logic may be performed by a processor that executes instructions in a program module, which is stored in a memory.

Another embodiment provides a method that includes at least some of the operations performed by and/or functions of the portable electronic device.

Another embodiment provides a computer-program product for use with the portable electronic device. This computer-program product includes instructions for at least some of the operations performed by and/or functions of the portable electronic device.

BRIEF DESCRIPTION OF THE FIGURES

FIG. 3 is a flow chart illustrating a method for performing an operation using the portable electronic device of FIG. 1 or FIG. 2 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a portable electronic device (such as a cellular telephone), a technique for performing an operation using the portable electronic device, and a computer-program product (e.g., software) for use with the portable electronic device are described. This portable electronic device provides signals corresponding to information to a display that allows a viewer or user to perceive 3-dimensional (3-D) depth, where the information includes multiple icons in a user interface that are arranged in 2-dimensional (2-D) fields that are spatially offset along a direction orthogonal to the 2-D fields. Then, the portable electronic device captures spatial-position information (such as a distance with respect to a surface of the display) associated with at least a digit of the viewer. The portable electronic device analyzes the spatial-position information to determine a change in a 3-D spatial position of at least the digit, and associates the change in the 3-D spatial position with at least one of the icons. Next, the portable electronic device performs the operation based on the change in the 3-D spatial position and at least the one of the icons.

By providing a 3-D user interface, the portable electronic device allows the user to efficiently view and manipulate the icons (and, more generally, information and content) associated with a wide variety of software applications. Furthermore, by presenting this information in 3-D, the portable electronic device overcomes the limitations posed by 2-D user interfaces and finite display sizes in existing portable electronic devices. In particular, the portable electronic device increases the effective display real estate and provides additional spatial degrees of freedom when organizing and sorting information. As a consequence, the portable electronic device may improve the user experience, with a commensurate impact on customer satisfaction, customer retention and sales.

In the discussion that follows, a user or an entity may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
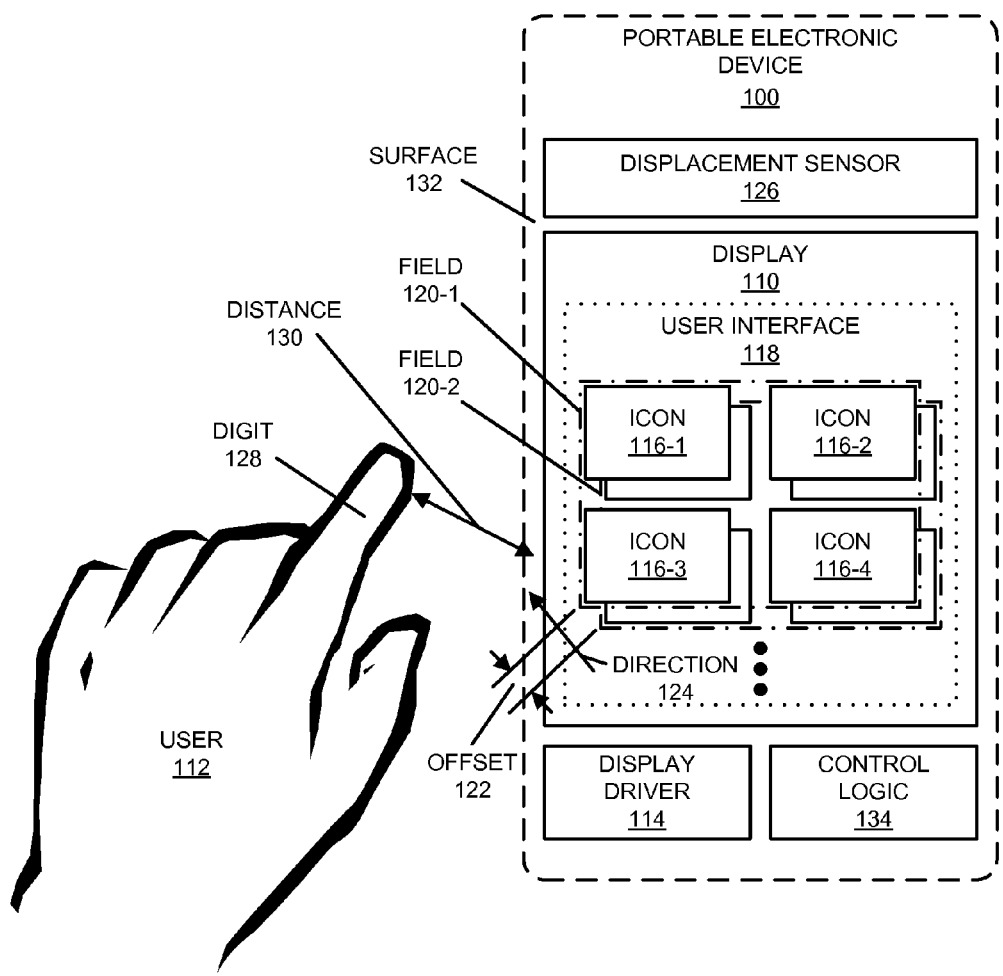
FIG. 1 is a block diagram illustrating a portable electronic device in accordance with an embodiment of the present disclosure.

We now describe embodiments of the portable electronic device. FIG. 1 presents a block diagram illustrating a portable electronic device 100. This portable electronic device includes a display 110 that conveys stereoscopic information which allows a viewer or user 112 to perceive 3-dimensional (3-D) depth, and a display driver 114 that provide signals corresponding to information to display 110. For example, display 110 may include an auto-stereoscopic display. Alternatively, display 110 may convey stereoscopic information to user 112 in conjunction with glasses worn by user 112 (such as glasses that include liquid-crystal lenses) that statically or dynamically change the polarization of light perceived by their eyes.

The displayed information may include multiple icons 116 in a user interface 118 that are arranged in 2-dimensional (2-D) fields 120 that are spatially offset 122 along a direction 124 orthogonal to 2-D fields 120, thereby providing a 3-D user interface. For example, icons 116 may be associated with applications that can execute in an environment of portable electronic device 100 and/or they may correspond to keys in a virtual keyboard. In general, the displayed information may include arbitrary information or content that is displayed with 3-D depth.

Moreover, portable electronic device 100 includes a displacement sensor 126 that captures spatial-position information associated with at least a digit 128 of user 112 (and, more generally, an arbitrary object in proximity to portable electronic device 100, such as a stylus), where the spatial-position information includes a distance 130 with respect to a surface 132 of display 110 or portable electronic device 100. Alternatively or additionally, the spatial-position information may include an orientation of at least digit 128 with respect to surface 132 of display 110 or portable electronic device 100.

For example, displacement sensor 126 may include an image sensor or at least two image sensors. The image sensor (such as a charge-coupled device or a CMOS image sensor) may determine distance 130 based on time of flight. Alternatively or additionally, at least the two image sensors, which may be spatially offset from each other on surface 132, may capture images from different perspectives, and by comparing these images displacement sensor 126 may determine distance 130 (such as based on angles between at least digit 128 and at least the two image sensors).

Furthermore, control logic 134 in portable electronic device 100: analyzes the spatial-position information to determine a change in a 3-D spatial position of at least digit 128; associates the change in the 3-D spatial position with at least one of icons 116; and performs an operation based on the change in the
3-D spatial position. Thus, user 112 may be able to interact with the content displayed by display 110 without directly touching surface 132 (i.e., user interface 118 may function as a virtual touchscreen).

For example, the operation may include modifying the information corresponding to at least the one of icons 116 based on the change in the 3-D spatial position. Note that modifying the information may include: a visual indication that an application associated with at least the one of icons 116 is executing (such as highlighting a given one of icons 116 or modulating its displayed intensity); changing a location of at least the one of icons 116 in 2-D fields 120 (such as when user 112 repositions a given icon either within a given 2-D field or between 2-D fields 120); and/or changing a size of at least the one of icons 116 (such as when user 112 expands or contracts the given icon by, respectively, pinching together or moving apart two or more digits and/or by changing an offset in the perspective of two partially overlapping icons). Moreover, the operation may include executing an application associated with at least the one of icons 116.

In an exemplary embodiment, user 112 may manipulate or activate one or more of icons 116 (and, more generally, may change a state associated with one or more of icons 116) by moving at least digit 128 in space. For example, user 112 may move virtually within user interface 118 by moving digit 128 and coarsely changing distance 130, such as by changing distance 130 by more than 10%. In this way, user 112 may transition between 2-D fields 120 (and, more generally, user 112 may perceive that they are moving among displayed objects that appear to be 'floating in air'). Similarly, an approximately horizontal displacement of at least digit 128 relative to surface 132 may allow the user to move between icons 116 in a given 2-D field. Once user 112 has arrived at a desired icon, user 112 may activate this icon by 'clicking' on it, such as by positioning digit 128 over the icon (or proximate to the icon) and finely moving digit 128 to change distance 130 (e.g., by changing distance 130 by less than 10%).

In other examples, user 112 may manipulate one or more of icons 116 using two or more digits, such as by: (virtually) grasping the given icon and rotating (or changing an orientation of their hand) within a plane approximately equidistant from surface 132, and/or expanding or contracting a displayed size of the given icon.

While the preceding examples included user 112 manipulating one or more of icons 116 using at least digit 128, more generally user 112 may interact with the content displayed by display 110 by performing a gesture (such as pulling, pushing, grasping, touching, rotating, etc.) that involves motion of at least digit 128 in space proximate to portable electronic device 100.

Note that functions of portable electronic device 100 may be implemented in hardware. Alternatively or additionally, functions of portable electronic device 100 may be implemented in software. For example, functions of display driver 114, displacement sensor 126 and/or control logic 134 may be performed by a processor that executes instructions in a program module, which is stored in a memory.

Figure 2:
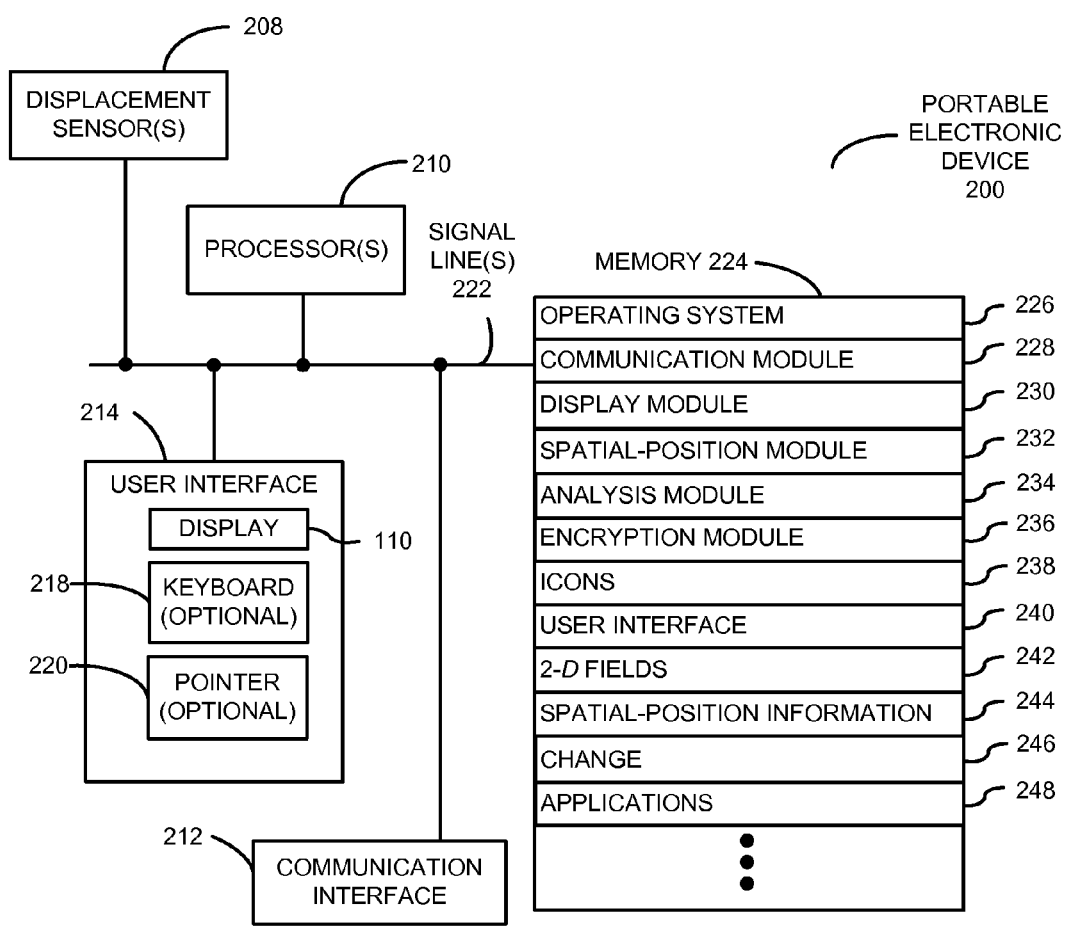
FIG. 2 is a block diagram illustrating a portable electronic device in accordance with an embodiment of the present disclosure.

This is shown in FIG. 2, which presents a block diagram illustrating a portable electronic device 200 (such as a cellular telephone or a smartphone). This portable electronic device includes one or more processing units or processors 210, a communication interface 212, a user interface 214, and one or more signal lines 222 coupling these components together. Note that the one or more processors 210 may support parallel processing and/or multi-threaded operation, the communication interface 212 may have a persistent communication connection, and the one or more signal lines 222 may constitute a communication bus. Moreover, the user interface 214 may include: display 110, an optional physical keyboard 218, and/or an optional pointer 220, such as a mouse.

Memory 224 in portable electronic device 200 may include volatile memory and/or non-volatile memory. More specifically, memory 224 may include: ROM, RAM, EPROM, EEPROM, flash memory, one or more smart cards, one or more magnetic disc storage devices, and/or one or more optical storage devices. Memory 224 may store an operating system 226 that includes procedures (or a set of instructions) for handling various basic system services for performing hardware-dependent tasks. Memory 224 may also store procedures (or a set of instructions) in a communication module 228. These communication procedures may be used for communicating with one or more portable electronic devices, computers and/or servers, including portable electronic devices, computers and/or servers that are remotely located with respect to portable electronic device 200.

Memory 224 may also include multiple program modules (or sets of instructions), including: display module 230 (or a set of instructions), spatial-position module 232 (or a set of instructions), analysis module 234 (or a set of instructions), encryption module 236 (or a set of instructions), and/or applications 248 (or sets of instructions). Note that one or more of these program modules (or sets of instructions) may constitute a computer-program mechanism.

During operation, display module 230 may provide signals corresponding to information to display 110 that allow a viewer or user to perceive 3-D depth, where the information includes multiple icons 238 in user interface 240 that are arranged in 2-D fields 242 that are spatially offset along a direction orthogonal to the 2-D fields. Then, spatial-position module 232 captures spatial-position information 244 (such as a distance with respect to a surface of display 110 or portable electronic device 200) associated with at least a digit of the user using one or more displacement sensors 208.

Next, analysis module 234 analyzes spatial-position information 244 to determine a change 246 in a 3-D spatial position of at least the digit, and associates change 246 in the 3-D spatial position with at least one of icons 238. Furthermore, operating system 226 may perform an operation (such as executing one of applications 248) based on change 246 in the 3-D spatial position.

Because information in portable electronic device 200 may be sensitive in nature, in some embodiments at least some of the data stored in memory 224 and/or at least some of the data communicated using communication module 228 is encrypted using encryption module 236.

Instructions in the various modules in memory 224 may be implemented in: a high-level procedural language, an object-oriented programming language, and/or in an assembly or machine language. Note that the programming language may be compiled or interpreted, e.g., configurable or configured, to be executed by the one or more processors 210.

Although portable electronic device 200 is illustrated as having a number of discrete items, FIG. 2 is intended to be a functional description of the various features that may be present in portable electronic device 200 rather than a structural schematic of the embodiments described herein. In practice, and as recognized by those of ordinary skill in the art, the functions of portable electronic device 200 may be distributed over a large number of servers or computers, with various groups of the servers or computers performing particular subsets of the functions. In some embodiments, some or all of the functionality of portable electronic device 200 may be implemented in one or more application-specific integrated circuits (ASICs) and/or one or more digital signal processors (DSPs).

Portable electronic device 200 may include one of a variety of devices capable of manipulating computer-readable data or communicating such data between two or more computing systems over a network, including: a personal computer, a laptop computer, a tablet computer, a cellular phone, a personal digital assistant, and/or a client computer (in a client-server architecture). Moreover, portable electronic device 200 may communicate via a network, such as: the Internet, World Wide Web (WWW), an intranet, a cellular-telephone network, LAN, WAN, MAN, or a combination of networks, or other technology enabling communication between computing systems.

Portable electronic device 100 (FIG. 1) and/or portable electronic device 200 may include fewer components or additional components. Moreover, two or more components may be combined into a single component, and/or a position of one or more components may be changed. In some embodiments, the functionality of portable electronic device 100 (FIG. 1) and/or portable electronic device 200 may be implemented more in hardware and less in software, or less in hardware and more in software, as is known in the art.

We now describe embodiments of a technique for performing an operation. FIG. 3 presents a flow chart illustrating a method 300 for performing an operation using a portable electronic device, such as portable electronic device 100 (FIG. 1) or 200 (FIG. 2). During this method, the portable electronic device provides signals corresponding to information to a display that allows a viewer to perceive 3-D depth (operation 310), where the information includes multiple icons in a user interface that are arranged in 2-D fields that are spatially offset along a direction orthogonal to the 2-D fields. Then, the portable electronic device captures spatial-position information (such as a distance with respect to a surface of the display) associated with at least a digit of the viewer (operation 312). The portable electronic device analyzes the spatial-position information to determine a change in a 3-D spatial position of at least the digit (operation 314), and associates the change in the 3-D spatial position with at least one of the icons (operation 316). Next, the portable electronic device performs the operation based on the change in the 3-D spatial position of at least the one of the icons (operation 318).

In some embodiments of method 300, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable electronic device, comprising:
    a display comprising a surface that facilitates a viewer perceiving 3-dimensional (3-D) depth;
    a display driver, coupled to the display, configured to provide signals corresponding to information to the display for producing a 3-D user interface, wherein:
        the information includes multiple icons that are arranged in 2-dimensional (2-D) fields in the 3-D user interface, wherein each of the 2-D fields comprises a different subset of the multiple icons;
        the 3-D user interface presents each of the 2-D fields as being in a separate plane that is parallel to the surface of the display and is at a different spatial offset from the display along a direction orthogonal to the surface of the display, wherein the 3-D user interface facilitates the viewer perceiving the multiple icons as being offset along the orthogonal direction;
    at least two image sensors that are spatially offset from each other;

a displacement sensor configured to capture spatial-position information associated with at least a digit of the viewer by:
  using the at least two image sensors to capture images from different perspectives; and
  comparing the images to determine a distance of the digit of the viewer with respect to the surface of the display; and
control logic, coupled to the displacement sensor, configured to:
  use the displacement sensor to determine the distance of the digit of the viewer at a given time;
  use the displacement sensor to determine the distance of the digit of the viewer at a current time, wherein the current time is different from the given time;
  determine, from the distance of the digit of the viewer at the given time and the distance of the digit of the viewer at the current time, that a change in a 3-D spatial position of the digit of the viewer with the respect to the display exceeds a predefined numerical threshold;
  associate the change in the 3-D spatial position with at least one of the icons; and
  perform an operation based on the change in the 3-D spatial position;
wherein the displacement sensor and the display are coplanar on a surface of the portable electronic device.

2. The portable electronic device of claim 1, wherein the operation includes modifying the information corresponding to at least the one of the icons based on the change in the 3-D spatial position.

3. The portable electronic device of claim 2, wherein modifying the information may include at least one of: including a visual indication that an application associated with at least the one of the icons is executing; changing a location of at least the one of the icons in the 2-D fields; and changing a size of at least the one of the icons.

4. The portable electronic device of claim 1, wherein the operation includes executing an application associated with at least the one of the icons.

5. The portable electronic device of claim 1, wherein the spatial-position information includes an orientation of at least the digit with respect to a surface of the display.

6. The portable electronic device of claim 1, wherein the displacement sensor determines the distance based on time of flight.

7. A portable electronic device, comprising:
a display comprising a surface that facilitates a viewer perceiving 3-dimensional (3-D) depth;
a processor;
memory;
at least two image sensors that are spatially offset from each other;
a displacement sensor affixed to the portable electronic device, wherein the displacement sensor and the display are coplanar on a surface of the portable electronic device; and
a program module, wherein the program module is stored in the memory and configurable to be executed by the processor to perform an operation, the program module including:
  instructions for providing signals corresponding to information to the display for producing a 3-D user interface, wherein:
    the information includes multiple icons that are arranged in 2-dimensional (2-D) fields in the 3-D user interface, wherein each of the 2-D fields comprises a different subset of the multiple icons;
    the 3-D user interface presents each of the 2-D fields as being in a separate plane that is parallel to the surface of the display and is at a different spatial offset from the display along a direction orthogonal to a plane of the surface of the display, wherein the 3-D user interface facilitates the viewer perceiving the multiple icons as being offset along the orthogonal direction;
  instructions for using the displacement sensor to capture spatial-position information associated with at least a digit of the viewer by:
    using the at least two image sensors to capture images from different perspectives; and
    comparing the images to determine a distance of the digit of the viewer with respect to the surface of the display;
  instructions for using the displacement sensor to determine the distance of the digit of the viewer at a given time;
  instructions for using the displacement sensor to determine the distance of the digit of the viewer at a current time, wherein the current time is different from the given time;
  instructions for determining, from the distance of the digit of the viewer at the given time and the distance of the digit of the viewer at the current time, that a change in a 3-D spatial position of the digit of the viewer with the respect to the display exceeds a predefined numerical threshold;
  instructions for associating the change in the 3-D spatial position with at least one of the icons; and
  instructions for performing the operation based on the change in the 3-D spatial position and at least the one of the icons.

8. The portable electronic device of claim 7, wherein the operation includes modifying the information corresponding to at least the one of the icons based on the change in the 3-D spatial position.

9. The portable electronic device of claim 8, wherein modifying of information may include at least one of: including a visual indication that an application associated with at least the one of the icons is executing; changing a location of at least the one of the icons in the 2-D fields; and changing a size of at least the one of the icons.

10. The portable electronic device of claim 7, wherein the operation includes executing an application associated with at least the one of the icons.

11. The portable electronic device of claim 7, wherein the spatial-position information includes an orientation of at least the digit with respect to a surface of the display.

12. The portable electronic device of claim 7, wherein the displacement sensor determines the distance based on time of flight.

13. A portable-electronic-device-implemented method for performing an operation, the method comprising:
providing signals corresponding to information to a display for producing a 3-dimensional (3-D) user interface, wherein:
  the information includes multiple icons that are arranged in 2-dimensional (2-D) fields in the 3-D user interface, wherein each of the 2-D fields comprises a different subset of the multiple icons;
  the 3-D user interface presents each of the 2-D fields as being in a separate plane that is parallel to the surface of the display and is at a different spatial offset from the display along a direction orthogonal to a plane of the surface of the display, wherein the 3-D user interface facilitates a viewer perceiving the multiple icons as being offset along the orthogonal direction;

using at least two image sensors to capture images from different perspectives;

using a displacement sensor to capture spatial-position information associated with at least a digit of the viewer by comparing the images to determine a distance of the digit of the viewer with respect to the surface of the display;

using the displacement sensor to determine the distance of the digit of the viewer at a given time;

using the displacement sensor to determine the distance of the digit of the viewer at a current time, wherein the current time is different from the given time;

determining, from the distance of the digit of the viewer at the given time and the distance of the digit of the viewer at the current time, that a change in a 3-D spatial position of the digit of the viewer with the respect to the display exceeds a predefined numerical threshold;

associating the change in the 3-D spatial position with at least one of the icons; and using the portable electronic device, performing the operation based on the change in the 3-D spatial position and at least the one of the icons;

wherein the displacement sensor and the display are coplanar on a surface of the portable electronic device.

14. The method of claim 13, wherein the operation includes modifying the information corresponding to at least the one of the icons based on the change in the 3-D spatial position.

15. A computer-program product for use in conjunction with a computer system, the computer-program product comprising a non-transitory computer-readable storage medium and a computer-program mechanism embedded therein, to perform an operation, the computer-program mechanism including:

instructions for providing signals corresponding to information to a display for producing a 3-dimensional (3D) user interface, wherein:

the information includes multiple icons that are arranged in 2-dimensional (2-D) fields in the 3-D user interface, wherein each of the 2-D fields comprises a different subset of the multiple icons;

the 3-D user interface presents each of the 2-D fields as being in a separate plane that is parallel to the surface of the display and is at a different spatial offset from the display along a direction orthogonal to a plane of the surface of the display, wherein the 3-D user interface facilitates a viewer perceiving the multiple icons as being offset along the orthogonal direction;

instructions for using a displacement sensor to capture spatial-position information associated with at least a digit of the viewer by:

using at least two image sensors to capture images from different perspectives; and comparing the images to determine a distance of the digit of the viewer with respect to the surface of the display;

instructions for using the displacement sensor to determine the distance of the digit of the viewer at a given time;

instructions for using the displacement sensor to determine the distance of the digit of the viewer at a current time, wherein the current time is different from the given time;

instructions for determining, from the distance of the digit of the viewer at the given time and the distance of the digit of the viewer at the current time, that a change in a 3-D spatial position of the digit of the viewer with the respect to the display exceeds a predefined numerical threshold;

instructions for associating the change in the 3-D spatial position with at least one of the icons; and instructions for performing the operation based on the change in the 3-D spatial position and at least the one of the icons;

wherein the displacement sensor and the display are coplanar on a surface of the portable electronic device.

16. The computer-program product of claim 15, wherein the operation includes modifying the information corresponding to at least the one of the icons based on the change in the 3-D spatial position.

* * * * *